(12) United States Patent
Yuki et al.

(10) Patent No.: US 12,257,909 B2
(45) Date of Patent: Mar. 25, 2025

(54) ELECTROMECHANICAL INTEGRATION UNIT

(71) Applicant: TOYOTA JIDOSHA KABUSHIKI KAISHA, Toyota (JP)

(72) Inventors: Keisuke Yuki, Toyota (JP); Yuya Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 18/121,822

(22) Filed: Mar. 15, 2023

(65) Prior Publication Data

US 2023/0382243 A1    Nov. 30, 2023

(30) Foreign Application Priority Data

May 25, 2022   (JP) .................................. 2022-085331

(51) Int. Cl.
| | |
|---|---|
| *B60K 6/22* | (2007.10) |
| *B60K 6/405* | (2007.10) |
| *B60L 1/00* | (2006.01) |
| *B60L 50/51* | (2019.01) |
| *B62D 5/04* | (2006.01) |
| *H02K 5/04* | (2006.01) |

(52) U.S. Cl.
CPC .............. *B60L 50/51* (2019.02); *B60K 6/405* (2013.01); *B60L 1/00* (2013.01); *B62D 5/0406* (2013.01); *B60L 2210/14* (2013.01); *B60L 2210/44* (2013.01); *H02K 5/04* (2013.01)

(58) Field of Classification Search
None
See application file for complete search history.

(56) References Cited

U.S. PATENT DOCUMENTS

| | | | |
|---|---|---|---|
| 6,201,365 B1 * | 3/2001 | Hara ......................... | B60L 1/02 |
| | | | 903/952 |
| 12,113,404 B2 * | 10/2024 | Okamoto ............... | H02K 11/33 |
| 12,134,324 B2 * | 11/2024 | Kishimoto ............ | B60L 3/0061 |
| 12,179,539 B2 * | 12/2024 | Anderson ................ | F03G 7/08 |

(Continued)

FOREIGN PATENT DOCUMENTS

| | | |
|---|---|---|
| JP | 2012-170172 A | 9/2012 |
| JP | 2019-103383 A | 6/2019 |
| JP | 2021-097524 A | 6/2021 |

*Primary Examiner* — Courtney L Smith
(74) *Attorney, Agent, or Firm* — Dinsmore & Shohl LLP

(57) ABSTRACT

The electromechanical integration unit includes a motor housed in a first chamber of the housing, and a first electrical unit and a second electrical unit housed in a second chamber of the housing. The housing includes multiple motor terminals arranged in the second chamber. The first electrical unit includes multiple first terminals arranged together with the motor terminals. The second electrical unit includes multiple motor terminals and multiple second terminals connected to the first terminals. The first electrical component of the first electrical unit, together with the second electrical component of the second electrical component, constitutes a power control circuit for controlling the power supplied to the motor. A service hole is provided in the second chamber of the housing, and the motor terminals and the first terminal are connected to the second terminals in a range exposed to the outside through the service hole.

8 Claims, 7 Drawing Sheets

(56) References Cited

U.S. PATENT DOCUMENTS

| | | | |
|---|---|---|---|
| 2005/0167183 A1* | 8/2005 | Tominaga | H05K 7/14322 |
| | | | 180/444 |
| 2013/0049495 A1* | 2/2013 | Matsuo | G06F 16/1748 |
| | | | 310/59 |
| 2013/0049550 A1* | 2/2013 | Watanabe | F04B 39/121 |
| | | | 310/67 R |
| 2019/0174647 A1 | 6/2019 | Umeda et al. | |
| 2020/0185907 A1* | 6/2020 | Griffiths | H01H 71/32 |
| 2021/0188241 A1* | 6/2021 | Kikuchi | B60W 20/15 |
| 2021/0194395 A1 | 6/2021 | Yamada et al. | |
| 2021/0339794 A1* | 11/2021 | Kawaguchi | H02K 5/225 |
| 2022/0173686 A1* | 6/2022 | Yuki | H02M 3/003 |
| 2022/0200398 A1* | 6/2022 | Fukunaga | H01R 13/52 |

\* cited by examiner

ELECTROMECHANICAL INTEGRATION UNIT

CROSS-REFERENCE TO RELATED APPLICATION

This application claims priority to Japanese Patent Application No. 2022-085331 filed on May 25, 2022, incorporated herein by reference in its entirety.

BACKGROUND

1. Technical Field

The technique disclosed in the present specification relates to an electromechanical integration unit.

2. Description of Related Art

Japanese Unexamined Patent Application Publication No. 2021-97524 (JP 2021-97524 A) discloses an electromechanical integration unit mounted on a vehicle. The electromechanical integration unit includes a motor housed in a first housing and a power control circuit (for example, a converter circuit or an inverter circuit) housed in a second housing. The first housing and the second housing are fixed to each other. Each housing is provided with an electrical connector on its exterior. The electrical connectors thereof are connected to each other. The electrical connectors thereof electrically connect the motor and the power control circuit housed in the separate housings.

SUMMARY

For example, for the purpose of reducing the size of the electromechanical integration unit, in the above-described electromechanical integration unit, a plurality of components such as the motor and the power control circuit may be housed in a common housing. In this case, one or more service holes are formed in the housing. Then, after the components are disposed in the housing, terminal groups provided for the components can be connected to each other from the outside through the service holes. The number of service holes provided in the housing can be freely designed in accordance with the number of terminals to be connected to each other (that is, the number of components). However, when the service holes are formed in the housing, for example, the size of the housing may be increased and the rigidity of the housing may be reduced. The present specification provides a technique capable of reducing the number of service holes required with respect to the number of terminal groups to be connected to each other.

The technique disclosed in the present specification is embodied as an electromechanical integration unit mounted on a vehicle. According to a first aspect, the electromechanical integration unit includes: a housing provided with a first chamber and a second chamber; at least one motor housed in the first chamber of the housing and connected to a wheel of the vehicle; a first electrical unit housed in the second chamber of the housing and provided with at least one first electrical component; and a second electrical unit housed in the second chamber of the housing and provided with at least one second electrical component. The housing may be provided with a plurality of motor terminals disposed in the second chamber and electrically connected to the at least one motor. The first electrical unit may be provided with a plurality of first terminals electrically connected to the at least one first electrical component and disposed together with the motor terminals. The second electrical unit may be provided with a plurality of second terminals electrically connected to the at least one second electrical component and connected to the motor terminals and the first terminals. The at least one first electrical component of the first electrical unit may constitute a power control circuit that controls power supplied to the at least one motor together with the second electrical component of the second electrical unit. A service hole may be provided in the second chamber of the housing. The motor terminals and the first terminals may be connected to the second terminals in a range that is externally exposed through an opening of the service hole.

In the above-described electromechanical integration unit, the power control circuit that controls the power supplied to the motor is configured using the at least one first electrical component provided in the first electrical unit and the at least one second electrical component provided in the second electrical unit. In other words, the electrical components constituting the power control circuit are distributed to two electrical units, the first electrical unit and the second electrical unit. According to such a configuration, it is possible to increase the degree of freedom in design of the first electrical unit and the second electrical unit. Further, the first electrical unit and the second electrical unit can be disposed by effectively using a limited space in the housing.

When the electrical components constituting the power control circuit are distributed to two electrical units, it is necessary to electrically connect three components including the two electrical units to the motor. In this regard, in the above-described electromechanical integration unit, the motor terminals electrically connected to the motor, the first terminals provided in the first electrical unit, and the second terminals provided in the second electrical unit are disposed so as to be exposed to the outside through a common service hole. According to such a configuration, it is possible to reduce the number of service holes required with respect to the number of terminal groups to be connected to each other. Thus, for example, it is possible to avoid or suppress an increase in the size of the housing and a decrease in the rigidity of the housing.

According to a second aspect, in the above first aspect, the housing may include a housing body provided with an opening portion in the second chamber, and a cover plate detachably attached to the opening portion of the housing body.

The second electrical unit may be fixed to the cover plate together with the second terminals. According to this configuration, after the cover plate is attached to the housing body, the second terminals, the motor terminals, and the first terminals may be connected to each other through the service hole.

According to a third aspect, in the above first or second aspect, the first terminals may be disposed in a straight line together with the motor terminals.

According to this configuration, the motor terminals and the first terminals may be disposed along a peripheral wall of the housing in which the service hole is provided. Accordingly, the motor terminals, the first terminals, and the second terminals are easily connected to each other through the service hole.

According to a fourth aspect, in the above third aspect, the first terminals may include a pair of terminals, each of which is disposed on each side of the motor terminals. According to this configuration, it is possible to avoid or suppress each wire connected to the first terminals from being crossed with a plurality of wires connected to the motor terminals. This makes it possible to avoid an excessive increase in temperature caused as the wires come close to each other.

According to a fifth aspect, in any of the first to fourth aspects above, the at least one first electrical component may include a reactor.

However, in another aspect, the at least one first electrical component is not limited to the reactor, and may include other electrical components constituting the power control circuit.

According to a sixth aspect, in the above fifth aspect, the power control circuit may include a boost converter and an inverter, the boost converter may boost direct-current power from a power source of the vehicle and supply the boosted direct-current power to the inverter, the inverter may convert the direct-current power from the boost converter into alternating-current power and supplies the alternating-current power to the at least one motor, and the reactor constitutes a part of the boost converter.

According to a seventh aspect, in any of the first to sixth aspects above, the second chamber of the housing is located above the first chamber, the first electrical unit may be located below the second electrical unit, the at least one motor may include a first motor and a second motor partially located above the first motor, the at least one first electrical component of the first electrical unit may be located above the first motor, and the at least one first electrical component of the first electrical unit may not be located above the second motor. According to this configuration, the at least one electrical component can be disposed in an excess space that may be caused by the arrangement of the first motor and the second motor. This makes it possible to reduce the size of the electromechanical integration unit.

According to an eighth aspect, in any of the first to seventh aspects above, the first electrical unit may further include at least one third electrical component, and the at least one third electrical component may constitute a charging circuit that converts direct-current power supplied from a power source of the vehicle into charging power supplied to an auxiliary battery of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Examples

Figure 1:
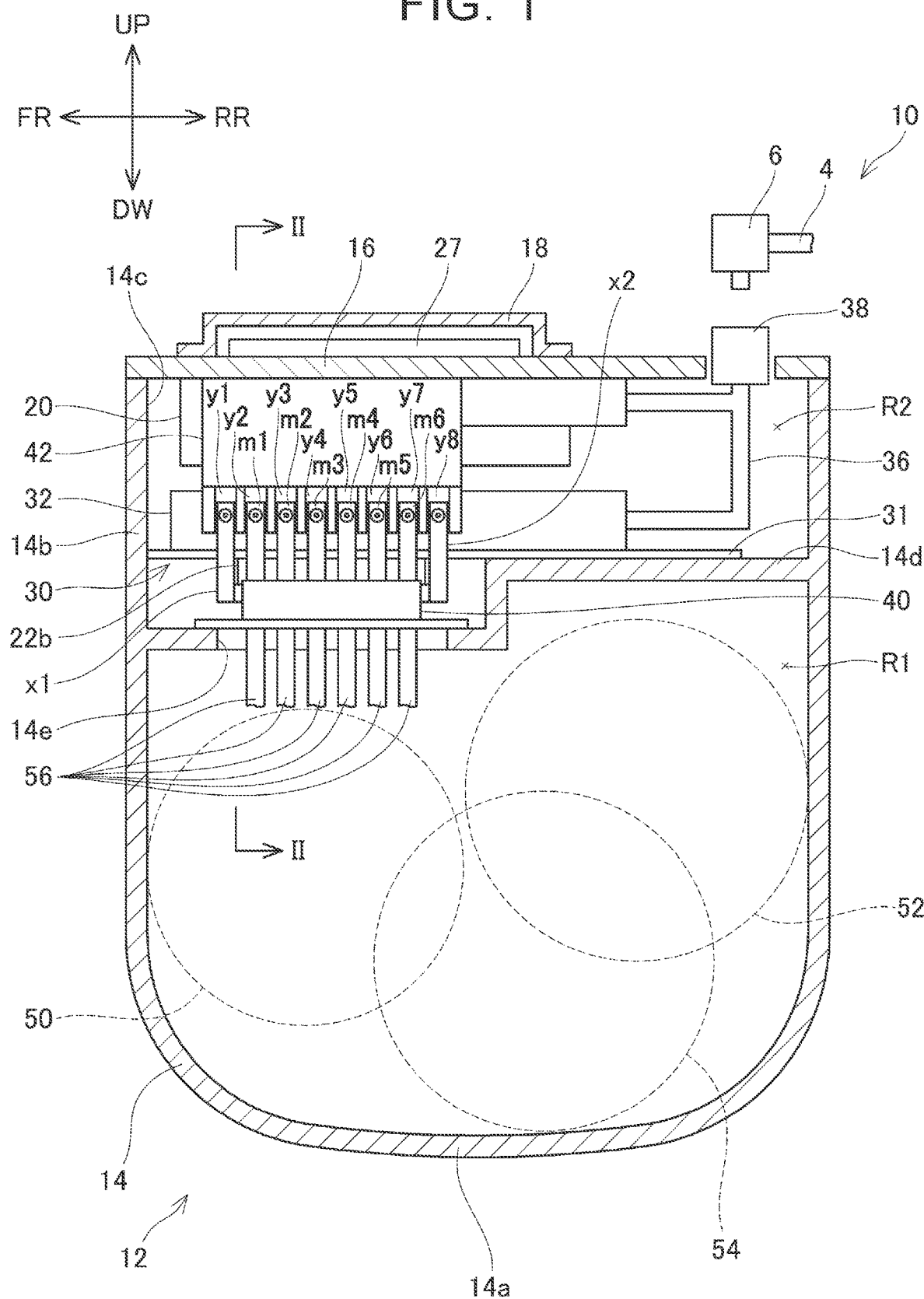
FIG. 1 is an end view schematically showing a configuration of an electromechanical integration unit 10.

The electromechanical integration unit 10 of the embodiment will be described with reference to FIGS. 1 to 5. The electromechanical integration unit 10 is mounted on a vehicle. Vehicles are, for example, hybrid electric vehicle driven by engines and motors. However, the vehicles are not limited to hybrid electric vehicle. For example, the vehicle may be a battery electric vehicle or an electrified vehicle driven by a motor, such as a fuel-powered vehicle.

Here, each direction of the electromechanical integration unit 10 in the drawings corresponds to a direction when mounted on a vehicle. That is, each direction of the electromechanical integration unit 10 in the drawings corresponds to the direction of the vehicle. Therefore, the direction FR indicates the front in the front-rear direction of the vehicle. The direction RR indicates the rear of the vehicle in the front-rear direction. The direction LH indicates a left direction in the left-right direction of the vehicle. The direction RH indicates a right direction in the left-right direction of the vehicle. The direction UP indicates an upward direction in the up-down direction of the vehicle. The direction DW indicates a vertical direction of the vehicle.

Figure 2:
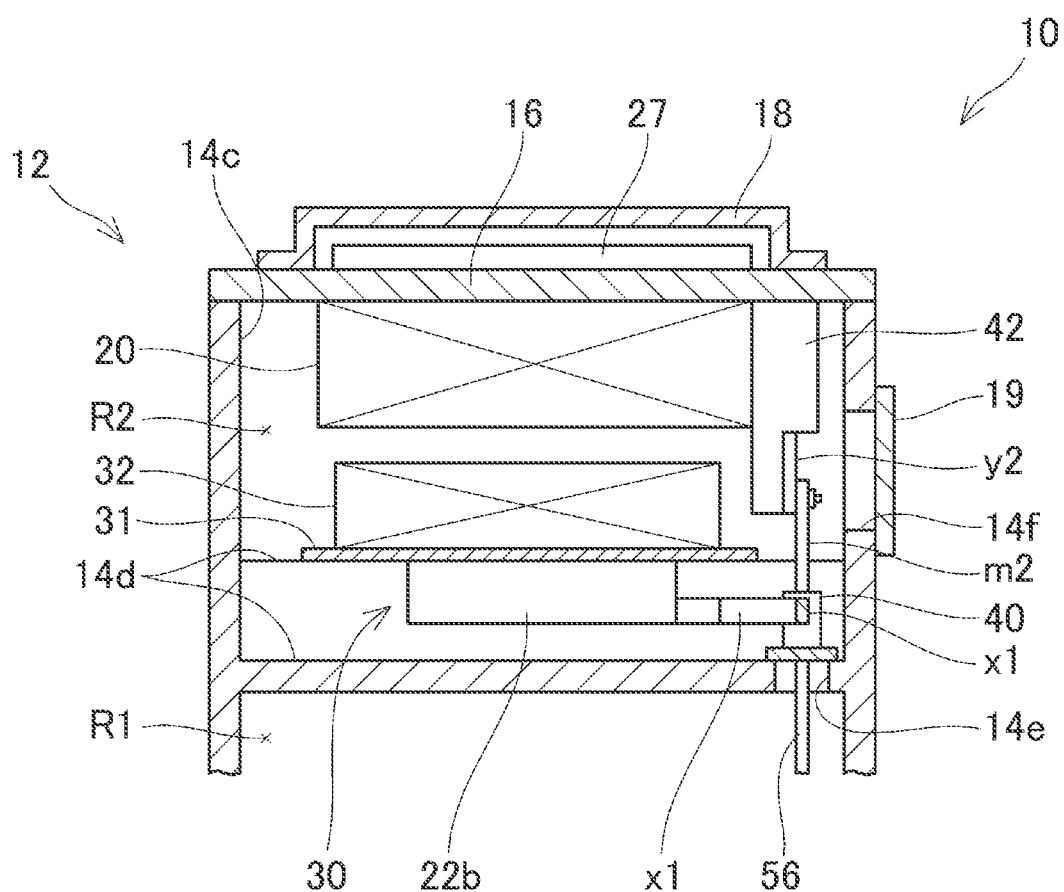
FIG. 2 is an end view of II-II of FIG. 1.
Figure 2:
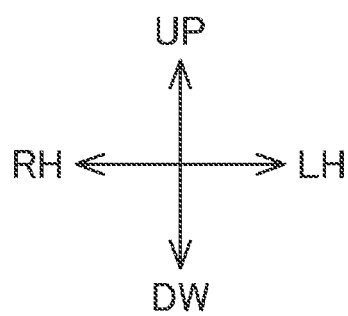

As shown in FIGS. 1 and 2, the electromechanical integration unit 10 includes a plurality of motors 50 and 52, a gear mechanism 54, a plurality of electrical units 20 and 30, a branch unit 36, a power socket 38, and a housing 12. The housing 12 integrally houses a plurality of motors 50 and 52, a gear mechanism 54, a plurality of electrical units 20 and 30, and a branch unit 36.

The housing 12 is a housing member. The housing 12 has a first chamber R1 and a second chamber R2. The second chamber R2 is located above the first chamber R1. The housing 12 includes a housing body 14 and a cover plate 16. The housing body 14 has a bottom wall 14a and a peripheral wall 14b. The peripheral wall 14b extends upward from an outer peripheral edge of the bottom wall 14a. The housing body 14 is made of a conductive material such as aluminum. The housing body 14 has an opening portion 14c in the second chamber R2 (i.e., the upper portion). The opening portion 14c of the housing body 14 is defined by a peripheral wall 14b. The housing body 14 is provided with a partition wall 14d. In the housing 12, a first chamber R1 and a second chamber R2 are defined by a partition wall 14d. The cover plate 16 is detachably attached to the opening portion 14c of the housing body 14. The cover plate 16 closes the opening portion 14c of the housing body 14. The cover plate 16 is a plate-shaped member. The cover plate 16 is made of a conductive material such as aluminum. At a rear portion of the cover plate 16, a power socket 38 is disposed so as to be exposed to the outside of the housing 12. A connector 6 connected to the power socket 38 via a power cable 4 of the power source 2 of the vehicle is connected. As a result, electric power from the power source 2 is supplied to the electromechanical integration unit 10.

A plurality of motors 50 and 52 and gear mechanisms 54 are disposed in the first chamber R1 of the housing 12. The plurality of motors 50 and 52 are driving motors that drive wheels of the vehicle. The plurality of motors 50 and 52 includes a first motor 50 and a second motor 52. The gear mechanism 54 includes, for example, a planetary gear mechanism, a reduction gear mechanism, and a differential gear mechanism. The plurality of motors 50, 52 and the gear mechanism 54 are connected to the wheels of the vehicle.

Specifically, the plurality of motors 50, 52 is connected to the wheels via a gear mechanism 54. The electromechanical integration unit 10 outputs the power of the plurality of motors 50 and 52 to the wheels via the gear mechanism 54. The plurality of motors 50 and 52 are driven by electric power from the power source 2 of the vehicle. However, the motor is not limited to a plurality of motors (two motors in the present embodiment), and may include at least one motor.

Figure 3:
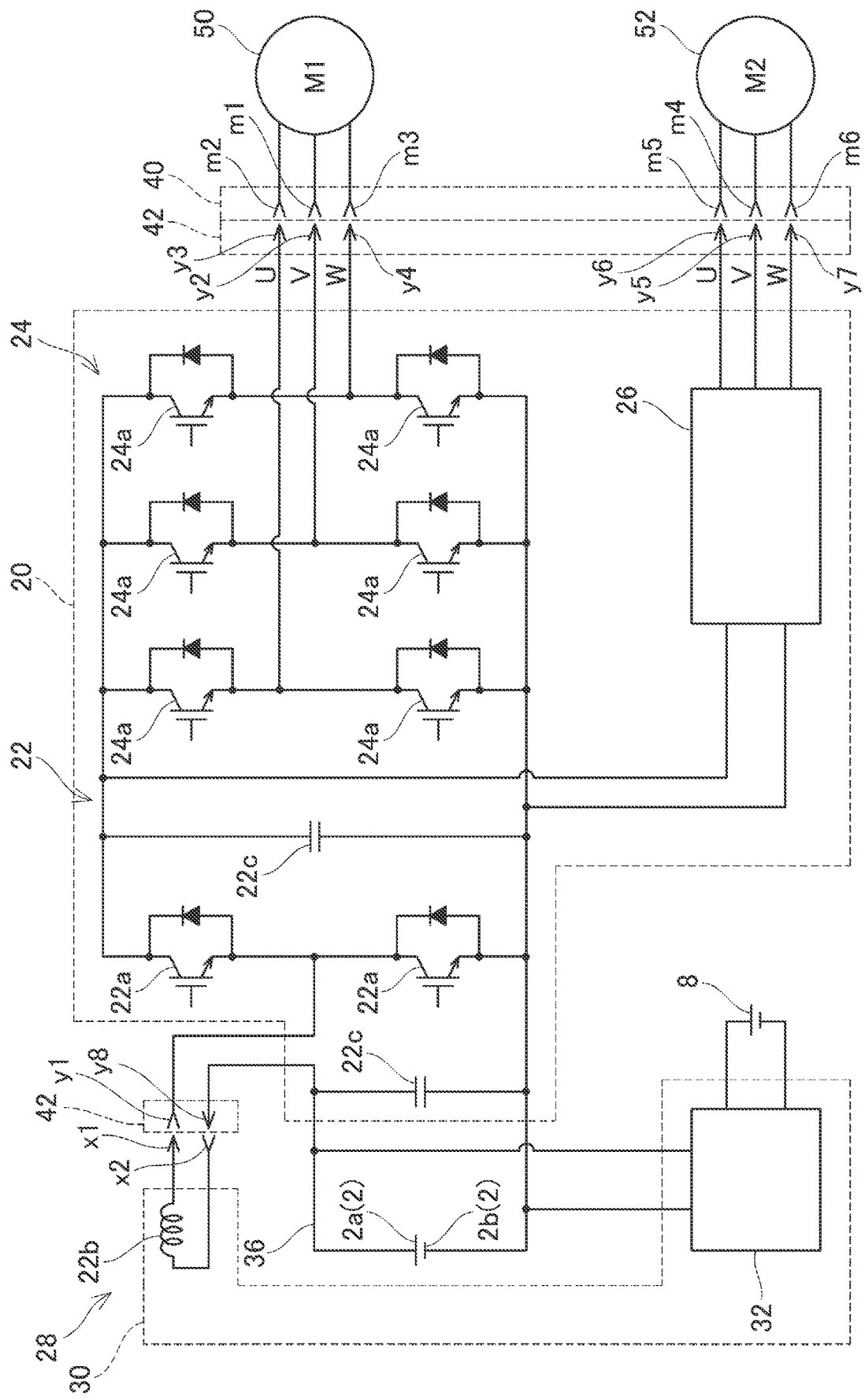
FIG. 3 is a block circuit diagram showing an electrical configuration of the electromechanical integration unit 10.

In the second chamber R2 of the housing 12, a plurality of electrical units 20 and 30, a motor terminal block 40, and a branch unit 36 are arranged. The plurality of electrical units 20, 30 includes an upper electrical unit 20 and a lower electrical unit 30. The lower electrical unit 30 is disposed below the upper electrical unit 20. The branch unit 36 is electrically connected to the power socket 38. The branch unit 36 is electrically connected to each of the plurality of electrical units 20 and 30. The electric power supplied from the power source 2 via the power socket 38 is distributed to the respective electrical units 20 and 30 by the branch unit 36. As shown in FIG. 3, the electromechanical integration unit 10 includes a power control circuit 28 and a charging circuit 32. The power control circuit 28 includes a plurality of electrical units 20 and 30. In other words, the branch unit 36 distributes the power from the power source 2 to the power control circuit 28 and the charging circuit 32.

Next, the power control circuit 28 will be described. The power control circuit 28 controls the power supplied to the plurality of motors 50 and 52. The power control circuit 28 includes a boost converter 22 and a plurality of inverters 24 and 26. The plurality of inverters 24 and 26 includes a first inverter 24 and a second inverter 26. The boost converter 22 boosts the DC power from the power source 2 of the vehicle, and supplies the boosted DC power to the first inverter 24 and the second inverter 26. The first inverter 24 converts the DC power from the boost converter 22 into AC power and supplies the AC power to the first motor 50. The second inverter 26 converts the DC power from the boost converter 22 into AC power, and supplies the converted AC power to the second motor 52.

The boost converter 22 is a DCDC converter. Specifically, the boost converter 22 includes two switching elements 22a, a reactor 22b, and two capacitive capacitors 22c. One end of one of the switching elements 22a is connected to the negative electrode 2b of the power source 2. The other end of one of the switching elements 22a is connected to the positive electrode 2a of the power source 2 via the reactor 22b. The other end of one switching element 22a is connected to one end of the other switching element 22a. The other end of the other switching element 22a is connected to the plurality of inverters 24 and 26. In one embodiment, one capacitive capacitor 22c is disposed between the power source 2 and the reactor 22b and the switching element 22a. The other capacitive capacitor 22c is disposed between the switching element 22a and the plurality of inverters 24 and 26.

Although not particularly limited, the switching element 22a of the boost converter 22 is a Reverse conducting Insulated Gate Bipolar Transistor (RC-IGBT) element. That is, the switching element 22a has an IGBT structure and a diode structure connected in anti-parallel thereto. An emitter having an IGBT structure and an anode having a diode structure are connected to one end of the above-described switching element 22a. A collector of an IGBT structure and a cathode of a diode structure are connected to the other end of the switching element 22a. However, the switching element 22a is not limited to RC-IGBT element, and may be a Metal-Oxide-Semi conductor Field-Effect Transistor (MOSFET) element or another type of switching element.

The first inverter 24 is a three-phase alternating current inverter circuit. The first inverter 24 has six switching elements 24a. The first inverter 24 outputs, to the first motor 50, AC power of three different phases, such as V-phase, U-phase, and W-phase, converted from DC power. The first inverter 24 is disposed between the boost converter 22 and the first motor 50. The second inverter 26 is also a three-phase AC inverter circuit similar to the first inverter 24. The second inverter 26 also has six switching elements (not shown). The second inverter 26 outputs, to the second motor 52, the AC power of three different phases, such as the V-phase, the U-phase, and the W-phase, converted from the DC power. The second inverter 26 is disposed between the boost converter 22 and the second motor 52. The switching elements 24a of the first inverter 24 and the switching elements of the second inverter 26 are the same as the switching element 22a of the boost converter 22.

In the electromechanical integration unit 10 according to the present embodiment, a plurality of electrical components constituting the above-described power control circuit 28 is distributed to each of the plurality of electrical units 20 and 30. The plurality of electrical units 20, 30 is housed in a second chamber R2 of the housing 12. The upper electrical unit 20 includes two switching elements 22a and two capacitive capacitors 22c of the boost converter 22, a switching element 24a of the first inverter 24, and a switching element of the second inverter 26. The lower electrical unit 30 has a reactor 22b of the boost converter 22.

Here, the lower electrical unit 30 is an example of a "first electrical unit" in the technology disclosed in the present specification. The reactor 22b is an exemplary "at least one first electrical component" in the technique disclosed in the present specification. The at least one first electrical component is not limited to a reactor 22b. The at least one first electrical component may include other electrical components that constitute the power control circuit 28 in place of or in addition to the reactor 22b. The upper electrical unit 20 is an example of a "second electrical unit" in the technology disclosed in the present specification. The two switching elements 22a and the two capacitive capacitors 22c of the boost converter 22, the switching element 24a of the first inverter 24, and the switching element of the second inverter 26 are exemplary "at least one second electrical component" in the technique disclosed in the present specification.

Figure 4:
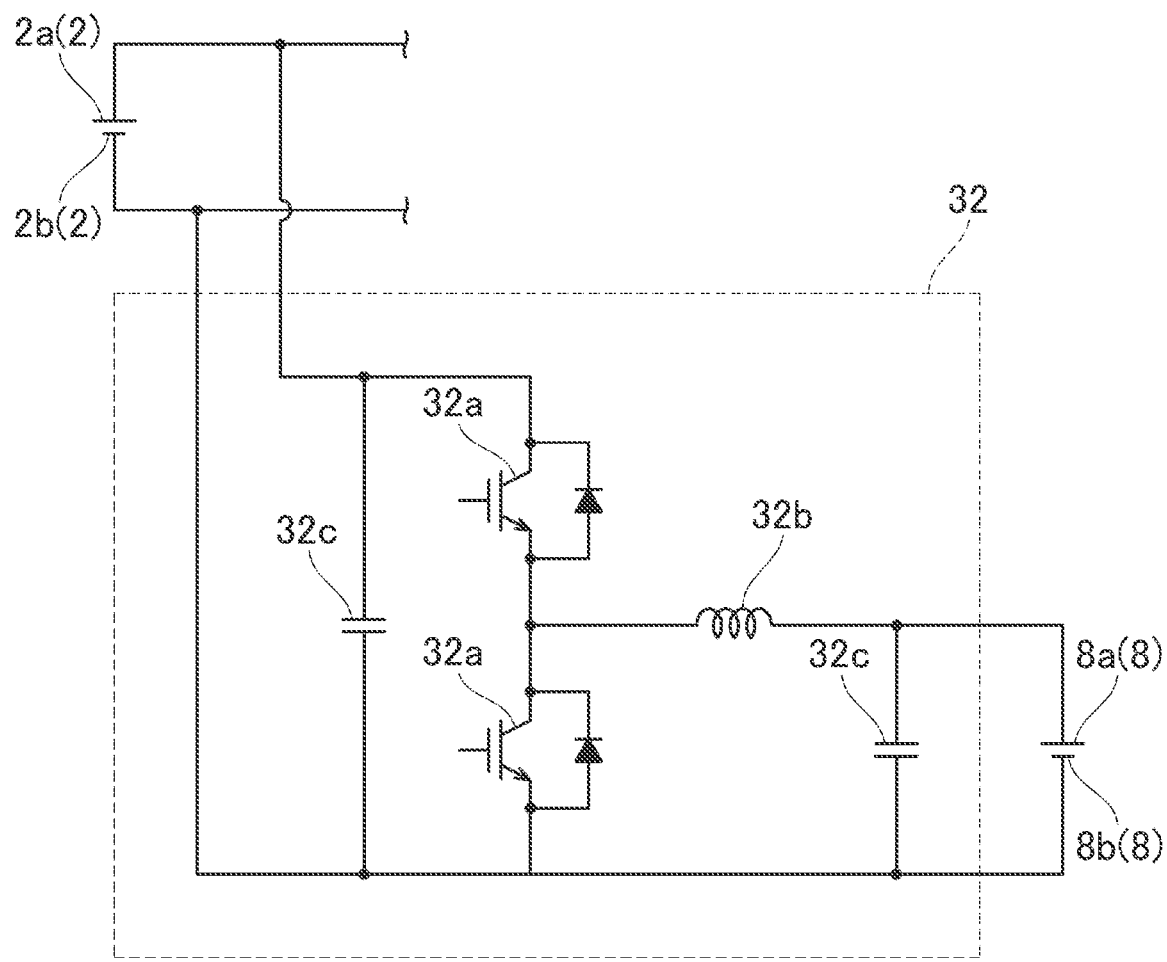
FIG. 4 is a block circuit diagram showing an electrical configuration of the charging circuit 32.

Next, the charging circuit 32 will be described. As illustrated in FIG. 4, the charging circuit 32 converts the DC power supplied from the power source 2 of the vehicle into the charging power supplied to the auxiliary battery 8 of the vehicle. The charge circuit 32 is a DCDC converter circuit. Specifically, the charge circuit 32 includes two switching elements 32a, a reactor 32b, and two capacitive capacitors 32c. One end of one of the switching elements 32a is connected to the positive electrode 2a of the power source 2. The other end of the switching element 32a is connected to the positive electrode 8a of the auxiliary battery 8 via the reactor 32b. The other end of one switching element 32a is connected to one end of the other switching element 32a. The other end of the other switching element 32a is connected to the negative electrode 8b of the auxiliary battery 8. The other end of the other switching element 32a is connected to the negative electrode 2b of the power source 2. In an exemplary embodiment, one capacitive capacitor 32c is disposed between the power source 2 and the switching element 32a. The other capacitive capacitor 32c is disposed between the switching element 32a and the reactor 32b and the auxiliary battery 8. The rated voltage of auxiliary battery 8 is 12 volts. The auxiliary battery 8 is connected to various control systems and other auxiliary devices of the vehicle. The auxiliary battery 8 supplies power to these components. The switching element 32a of the charge circuit 32 is the same as the switching element 22a of the boost converter 22.

The lower electrical unit 30 includes a plurality of electrical components and a base plate 31 in addition to the reactor 22b of the power control circuit 28. The plurality of electrical components constitutes the charging circuit 32. The base plate 31 supports the plurality of electrical components. Here, the plurality of electrical components (that is, the two switching elements 32a, the reactor 32b, and the two capacitive capacitors 32c) constituting the charge circuit 32 are exemplary of "at least one third electrical component" in the technique disclosed in the present specification.

In the lower electrical unit 30, the charging circuit 32 is fixed to the upper surface (i.e., the upper electrical unit 20 side) of the base plate 31. The reactor 22b is fixed to the lower surface of the base plate 31 (i.e., the partition wall 14d of the housing body 14). The lower electrical unit 30 is attached to the partition wall 14d of the housing 12 via the base plate 31. Although described above, in the present embodiment, in the first chamber R1, the second motor 52 is positioned above the first motor 50. The reactor 22b of the power control circuit 28 of the lower electrical unit 30 is located above the first motor 50 in the second chamber R2. On the other hand, the reactor 22b is not positioned above the second motor 52 in the second chamber R2 (see FIG. 1). According to this configuration, the reactor 22b can be disposed in an excess space that can be caused by the arrangement of the first motor 50 and the second motor 52. This makes it possible to reduce the size of the electromechanical integration unit 10.

In the second chamber R2, the upper electrical unit 20 is fixed to the cover plate 16 of the housing 12. Although not particularly limited, the first inverter 24 and the second inverter 26 and the electrical components other than the reactor 22b of the boost converter 22 are disposed on the lower surface of the cover plate 16. A control board 27 connected to the first inverter 24, the second inverter 26, and the boost converter 22 is disposed on the upper surface of the cover plate 16. The control board 27 includes components such as a CPU and a processor incorporating memories. The control board 27 controls the operations of the first inverter 24, the second inverter 26, and the boost converter 22. A protective cover 18 is provided on the cover plate 16. The protective cover 18 is a plate-shaped member. The protective cover 18 is made of a conductive material such as aluminum. The protective cover 18 covers the control board 27 located on the upper surface of the cover plate 16.

The electromechanical integration unit 10 includes a plurality of motor terminals m1 to m6, a plurality of reactor terminals x1, x2, and a plurality of connecting terminals y1 to y8. An m6 from the plurality of motor terminals m1 is provided in the second chamber R2 of the housing 12. From the plurality of motor terminals m1 to m6 includes six motor terminals from the first motor terminal m1 to the sixth motor terminal m6. The plurality of motor terminals m1 to m6 is arranged in the order from the first motor terminal m1 to the sixth motor terminal m6 from the front to the rear in the second chamber R2. m6 from the motor terminals m1 has a plate-like shape having a pair of wide surfaces. m6 from the plurality of motor terminals m1 are arranged such that their wide surfaces are substantially aligned. m6 from the plurality of motor terminals m1 is made of a conductive material such as a metallic material. The partition wall 14d of the housing 12 is provided with a through-hole 14e penetrating from the first chamber R1 to the second chamber R2. A motor terminal block 40 is provided on the opening of the through-hole 14e formed in the second chamber R2. The motor terminal block 40 has a generally box shape. The motor terminal block 40 is formed of an insulating material such as resin. The motor terminal block 40 is disposed on the partition wall 14d so as to close the opening. m6 from the plurality of motor terminals m1 is supported and fixed above the partition wall 14d by the motor terminal block 40. m6 from the plurality of motor terminals m1 protrudes upward from the upper surface of the motor terminal block 40. The motor terminal block 40 is provided with a plurality of motor busbars 56 protruding toward the first chamber R1 through the through-hole 14e. An upper end of each of the plurality of motor busbars 56 is m6 from a corresponding motor terminal m1. A lower end of each of the plurality of motor busbars 56 is electrically connected to the first motor 50 or the second motor 52, respectively. Accordingly, m6 from the plurality of motor terminals m1 is electrically connected to the first motor 50 or the second motor 52 via the plurality of motor busbars 56. Specifically, the third motor terminal m3 from the first motor terminal m1 is electrically connected to the first motor 50 (see FIG. 3). The fourth motor terminal m4 to the sixth motor terminal m6 are connected to the second motor 52 (see FIG. 3).

A y8 is provided from a plurality of connecting terminals y1 on the left side surface of the upper electrical unit 20. The plurality of connection terminals y1 to y8 includes eight connection terminals from the first connection terminal y1 to the eighth connection terminal y8. As an example, the plurality of connection terminals y1 to y8 are arranged in the order from the first connection terminal y1 to the eighth connection terminal y8 from the front to the rear. The connecting terminals y1 to y8 have a plate shape or a foil shape having a pair of wide surfaces. y8 from the plurality of connection terminals y1 is fixed to the upper electrical unit 20 via the connection terminal block 42. Thus, y8 from the plurality of connecting terminals y1 is integrally formed with the upper electrical unit 20. That is, y8 from the plurality of connecting terminals y1 is fixed to the cover plate 16 together with the upper electrical unit 20. The connection terminal block 42 has a generally box shape. The connection terminal block 42 is formed using an insulating material such as a resin. y8 from the plurality of connection terminals y1 is exposed from the lower end portion of the connection terminal block 42 on the left side surface of the connection terminal block 42. A wiring (not shown) constituting a part of the power control circuit 28 is arranged inside the connection terminal block 42. y8 from the plurality of terminals y1 are connected to corresponding wires, and are connected to the power control circuit 28. Specifically, the first connecting terminal y1 is electrically connected to one end of the other switching element (the reactor 22b output-side) of the boost converter 22 via the wire. Each of the seventh connection terminals y7 from the second connection terminal y2 is electrically connected to two corresponding switching elements of the plurality of switching elements 24a of the first inverter 24 or the plurality of switching elements of the second inverter 26 via the wiring. The eighth connecting terminal y8 is electrically connected to the power source 2 via the wire.

The lower electrical unit 30 is provided with a plurality of reactor terminals x1, x2. The plurality of reactor terminals x1, x2 includes a first reactor terminal x1 and a second reactor terminal x2. In one embodiment, the plurality of reactor terminals x1, x2 have a plate-like configuration having a pair of wide surfaces. The plurality of reactor terminals x1, x2 are arranged such that their wide surfaces are substantially aligned. Each of the plurality of reactor terminals x1, x2 is arranged adjacently to m6 from the plurality of motor terminals m1. The first reactor terminal x1 is located in front of the plurality of motor terminals m1. The second reactor terminal x2 is located behind the plurality of motor terminals m1. The plurality of reactor terminals x1, x2 are arranged substantially in a straight line together with the plurality of motor terminals (see FIGS. 1 and 2). The plurality of reactor terminals x1, x2 extend upward from the plurality of connecting terminals y1 of the upper electrical unit 20 toward y8 from the reactor 22$b$ located at the lower portion of the lower electrical unit 30. The plurality of reactor terminals x1, x2 are electrically connected to the reactor 22$b$. The first reactor terminal x1 is electrically connected to the switching element 22$a$ of the reactor 22$b$. The second reactor terminal x2 is electrically connected to the power source 2 of the reactor 22$b$.

Here, the plurality of reactor terminals x1, x2 is an exemplary "plurality of first terminals" in the technique disclosed in the present specification. y8 from the plurality of connecting terminals y1 is an exemplary "plurality of second terminals" in the technique disclosed in the present specification.

Figure 5:
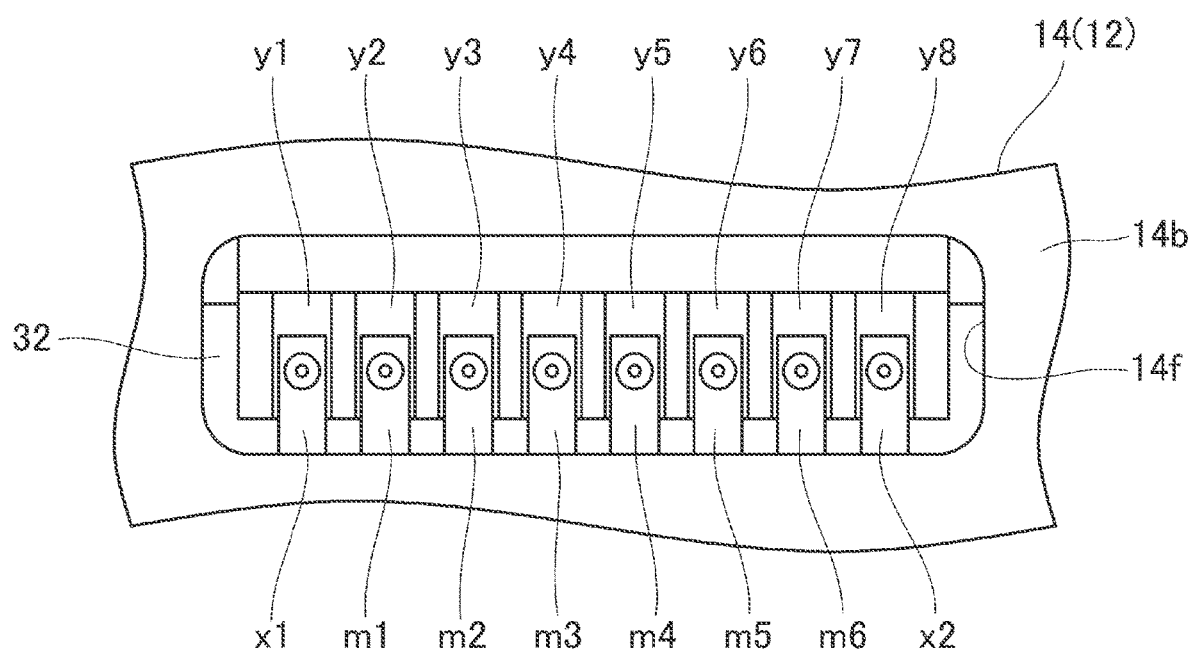
FIG. 5 is a diagram illustrating a configuration of m6, a plurality of reactor terminals x1, x2, and a plurality of connecting terminals y1 to y8 from a plurality of motor terminals m1 exposed from the service hole 14f.
Figure 5:
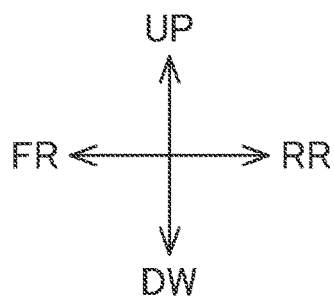

As shown in FIGS. 1 and 5, the second chamber R2 of the housing 12 is provided with a service hole 14$f$. In the area exposed to the outside through the opening of the service hole 14$f$, m8 and the reactor terminals x1, x2 from the plurality of motor terminals m1 are connected to y8 from the plurality of connecting terminals y1. In an exemplary embodiment, m8 and the reactor terminals x1, x2 are fastened from the plurality of motor terminals m1 onto y8 from the plurality of connecting terminals y1 by fasteners such as bolts and nuts. Specifically, the first reactor terminal x1 is connected to the first connecting terminal y1. The second reactor terminal x2 is connected to the eighth connecting terminal y8. Therefore, the DC power from the power source 2 is supplied to the upper electrical unit 20 via the reactor 22$b$ of the lower electrical unit 30. The first motor terminal m1 is connected to the second connecting terminal y2. V-phase AC power is supplied from the upper electrical unit 20 to the first motor 50. The second motor terminal m2 is connected to the third connecting terminal y3. AC power of the U-phase is supplied from the upper electrical unit 20 to the first motor 50. The third motor terminal m3 is connected to the fourth connecting terminal y4. The W-phase AC power is supplied from the upper electrical unit 20 to the first motor 50. The fourth motor terminal m4 is connected to the fifth connecting terminal y5. V-phase AC power is supplied from the upper electrical unit 20 to the second motor 52. The fifth motor terminal m5 is connected to the sixth connecting terminal y6, and the U-phase AC power is supplied from the upper electrical unit 20 to the second motor 52. The sixth motor terminal m6 is connected to the seventh connecting terminal y7. The W-phase AC power is supplied from the upper electrical unit 20 to the second motor 52.

In the electromechanical integration unit as in the present embodiment, for example, for the purpose of miniaturization of the electromechanical integration unit, it is conceivable that a plurality of components such as a motor and a power control circuit are accommodated in a common housing. In this case, when one or a plurality of service holes are formed in the housing, after the plurality of components are arranged in the housing, the terminal groups provided in the components can be connected to each other from the outside through the service hole. The number of service holes provided in the housing can be freely designed according to the number of terminals to be connected to each other (that is, the number of components). However, if a plurality of service holes is formed in the housing, for example, the size of the housing may be increased and the rigidity of the housing may be reduced.

In the electromechanical integration unit 10 of the present embodiment, the electric power control circuit 28 is configured to control the electric power supplied to the plurality of motors 50 and 52 by using the reactor 22$b$ and a plurality of electrical components (for example, a plurality of switching elements 22$a$, 24$a$ and the like) provided in the upper electrical unit 20. The reactor 22$b$ is provided in the lower electrical unit 30. The plurality of electrical components is provided in the upper electrical unit 20. In other words, a plurality of electrical components constituting the power control circuit 28 is distributed to two electrical units, the upper electrical unit 20 and the lower electrical unit 30. According to such a configuration, it is possible to increase the degree of freedom in design of the upper electrical unit 20 and the lower electrical unit 30. Furthermore, the upper electrical unit 20 and the lower electrical unit 30 can be arranged by effectively utilizing a limited space in the housing 12.

When a plurality of electrical components constituting the power control circuit 28 are distributed to two electrical units 20, 30, three components including two electrical units 20, 30 need to be electrically connected to each other in the motors 50, 52. In this regard, in the above-described electromechanical integration unit 10, three parties of a plurality of motor terminals m1 electrically connected to the motors 50 and 52 to m6, a plurality of reactor terminals x1, x2 provided in the lower electrical unit 30, and a plurality of connecting terminals y1 to y8 provided in the upper electrical unit 20 are arranged so as to be exposed to the outside through a common-service-hole 14$f$. According to such a configuration, the number of service holes required can be reduced with respect to the number of terminal groups to be connected to each other. Thus, for example, it is possible to avoid or suppress an increase in the size of the housing 12 and a decrease in the rigidity of the housing 12.

Figure 6:
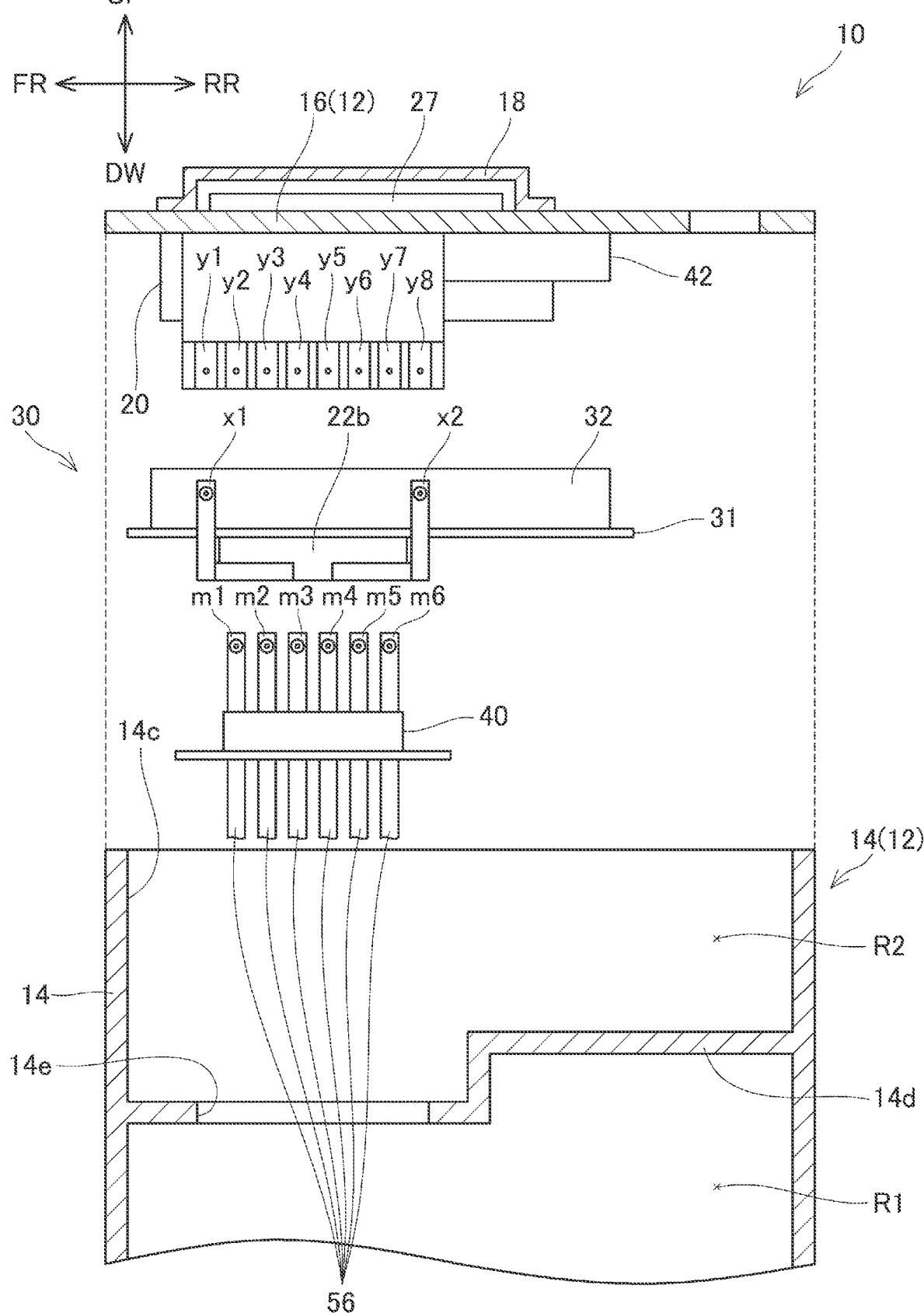
FIG. 6 is an exploded view illustrating an exemplary assembly process of the electromechanical integration unit 10.
Figure 7:
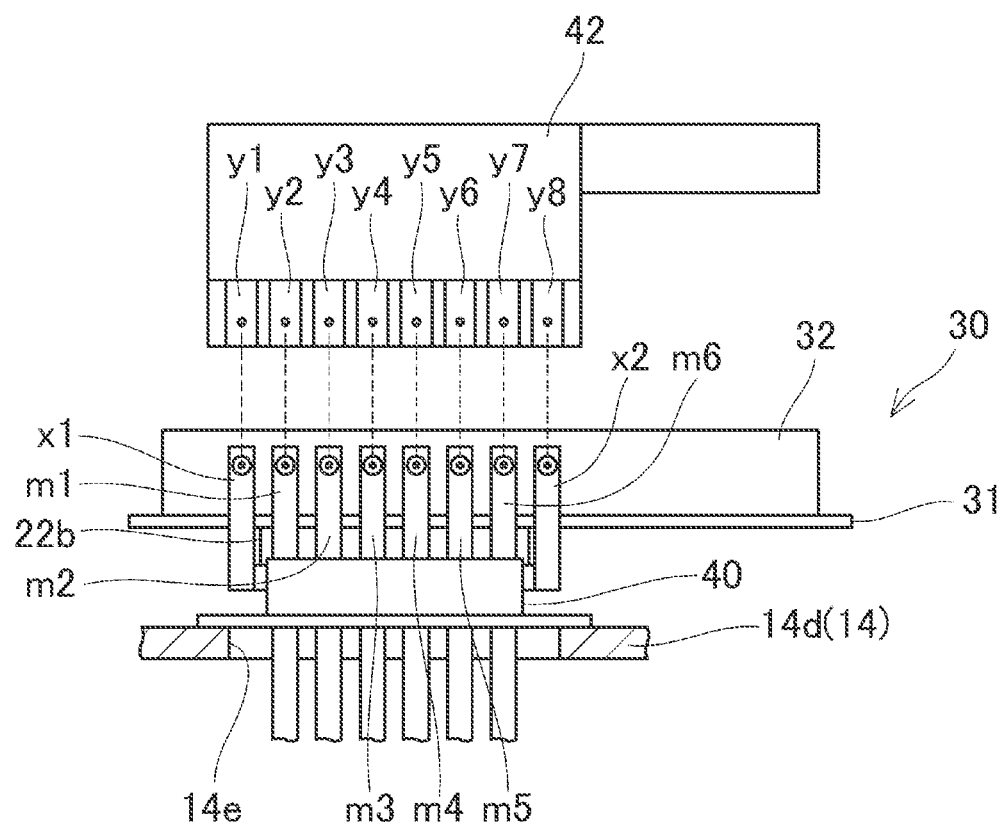
FIG. 7 is a diagram illustrating connection between a plurality of reactor terminals x1, x2 and a plurality of motor terminals m1 to m6 and a plurality of connecting terminals y1 to y8.
Figure 7:
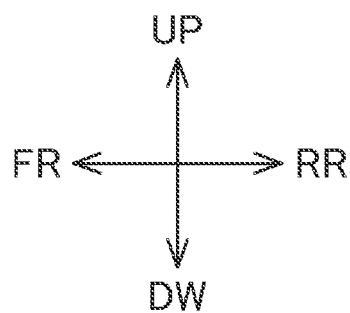

Now, referring to FIGS. 6 and 7, an exemplary assembly process in the second chamber R2 of the electromechanical integration unit 10 will be described in detail. Here, the power socket 38 and the branch unit 36 are not shown. Further, the description of the attachment of the power socket 38 and the branch unit 36 is omitted. First, as shown in FIGS. 6 and 7, the motor terminal block 40 for supporting m6 from the plurality of motor terminals m1 is mounted on the through-hole 14$e$ of the partition wall 14$d$. At this time, the plurality of motor busbars 56 extending to the first chamber R1 are electrically connected to one of the first motor and the second motor (not shown). Next, the base plate 31 of the lower electrical unit 30 is fixed to an area located on the second motor of the partition wall 14$d$. At this time, the lower electrical unit 30 is arranged such that the plurality of reactor terminals x1, x2 are located on both sides of m6 from the plurality of motor terminals m1. The upper electrical unit 20 is then attached to the cover plate 16. At this time, the connection terminal block 42 is fixed to the upper electrical unit 20. The connection terminal block 42 is fixed to the lower surface of the cover plate 16 together with the upper electrical unit 20. A control board 27 is fixed to an upper surface of the cover plate 16. Then, the protective cover 18 is mounted on the control board 27 disposed on the cover plate 16. Then, the cover plate 16 to which the upper electrical unit 20 is attached is attached to the opening portion 14c of the housing body 14. At this time, on y8 from the plurality of connection terminals y1 arranged in the connection terminal block 42, m6 from the plurality of corresponding motor terminals m1, and a plurality of reactor terminals x1, x2 of the lower electrical unit 30 are arranged. Finally, through the service hole 14f of the housing 12, m6 are bolted from the plurality of connecting terminals y1 to y8, the plurality of reactor terminals x1, x2, and the plurality of motor terminals m1. As described above, the electromechanical integration unit 10 is assembled.

The housing 12 in the present embodiment includes a housing body 14 having an opening portion 14c in the second chamber R2, and a cover plate 16. The cover plate 16 is detachably attached to the opening portion 14c. Here, the upper electrical unit 20 is fixed to the cover plate 16 together with y8 from the plurality of connecting terminals y1. According to this configuration, after the cover plate 16 is attached to the housing body 14, y8 from the plurality of connecting terminals y1 and m6 and the plurality of reactor terminals x1, x2 can be connected to each other from the plurality of motor terminals m1 through the service hole 14f.

The plurality of reactor terminals x1, x2 in the present embodiment are arranged in a straight line from the plurality of motor terminals m1 together with m6. According to this configuration, m6 and the plurality of reactor terminals x1, x2 can be arranged from the plurality of motor terminals m1 along the peripheral wall 14b of the housing 12 provided with the service hole 14f. Accordingly, the plurality of motor terminals m1 to m6 and the plurality of reactor terminals x1, x2 and the plurality of connecting terminals y1 to y8 are easily connected through the service hole 14f.

The plurality of reactor terminals x1, x2 in the present embodiment have a pair of terminals arranged on both sides of m6 from the plurality of motor terminals m1. According to this configuration, it is possible to avoid or suppress the wiring connected to the plurality of reactor terminals x1, x2 from being crossed with the plurality of wiring connected to m6 from the plurality of motor terminals m1. This makes it possible to avoid an excessive increase in temperature caused by the proximity of the plurality of wires. However, the configuration is not limited to the configuration of the present embodiment, and the plurality of reactor terminals x1, x2 may not be located on both sides of m6 from the plurality of motor terminals m1. Further, the order of the arrangement of the plurality of motor terminals m1 to m6 is not limited to the embodiment. m6 may be arranged in another order from the plurality of motor terminals m1. In this case, the arrangement of y8 from the plurality of connecting terminals y1 may also be changed according to the arrangement of m6 and the plurality of reactor terminals x1, x2 from the plurality of motor terminals m1.

Although the specific examples disclosed by the present disclosure have been described in detail above, these are merely examples and do not limit the scope of claims. The techniques described in the claims include various modifications and alternations of the specific examples illustrated above. The technical elements described in this specification or in the drawings may be used alone or in various combinations, and are not limited to the combinations described in the claims at the time of filing. The technology illustrated in the present specification or the drawings can achieve a plurality of objects at the same time, and has technical usefulness in achieving one of the objects.

What is claimed is:

1. An electromechanical integration unit mounted on a vehicle, the electromechanical integration unit comprising:
    a housing provided with a first chamber and a second chamber;
    at least one motor housed in the first chamber of the housing and connected to a wheel of the vehicle;
    a first electrical unit housed in the second chamber of the housing and provided with at least one first electrical component; and
    a second electrical unit housed in the second chamber of the housing and provided with at least one second electrical component, wherein:
    the housing is provided with a plurality of motor terminals disposed in the second chamber and electrically connected to the at least one motor;
    the first electrical unit is provided with a plurality of first terminals electrically connected to the at least one first electrical component and disposed together with the motor terminals;
    the second electrical unit is provided with a plurality of second terminals electrically connected to the at least one second electrical component and connected to the motor terminals and the first terminals;
    the at least one first electrical component of the first electrical unit constitutes a power control circuit that controls power supplied to the at least one motor together with the second electrical component of the second electrical unit;
    a service hole is provided in the second chamber of the housing; and
    the motor terminals and the first terminals are connected to the second terminals in a range that is externally exposed through an opening of the service hole.

2. The electromechanical integration unit according to claim 1, wherein:
    the housing includes
        a housing body provided with an opening portion in the second chamber, and
        a cover plate detachably attached to the opening portion of the housing body; and
    the second electrical unit is fixed to the cover plate together with the second terminals.

3. The electromechanical integration unit according to claim 1, wherein the first terminals are disposed in a straight line together with the motor terminals.

4. The electromechanical integration unit according to claim 3, wherein the first terminals include a pair of terminals, each of which is disposed on each side of the motor terminals.

5. The electromechanical integration unit according to claim 1, wherein the at least one first electrical component includes a reactor.

6. The electromechanical integration unit according to claim 5, wherein:
    the power control circuit includes a boost converter and an inverter;
    the boost converter boosts direct-current power from a power source of the vehicle and supplies the boosted direct-current power to the inverter;
    the inverter converts the direct-current power from the boost converter into alternating-current power and supplies the alternating-current power to the at least one motor; and
    the reactor constitutes a part of the boost converter.

7. The electromechanical integration unit according to claim 1, wherein:
    the second chamber is located above the first chamber;
    the first electrical unit is located below the second electrical unit;

the at least one motor includes a first motor and a second motor partially located above the first motor;

the at least one first electrical component of the first electrical unit is located above the first motor; and the at least one first electrical component of the first electrical unit is not located above the second motor.

8. The electromechanical integration unit according to claim 1, wherein:

the first electrical unit further includes at least one third electrical component; and the at least one third electrical component constitutes a charging circuit that converts direct-current power supplied from a power source of the vehicle into charging power supplied to an auxiliary battery of the vehicle.

* * * * *